United States Patent [19]

Audett et al.

[11] Patent Number: 5,331,049

[45] Date of Patent: Jul. 19, 1994

[54] WATER-CURABLE, HOT MELT ADHESIVE COMPOSITION

[75] Inventors: Jay D. Audett, Houston; Mun F. Tse, Seabrook, both of Tex.

[73] Assignee: Exxon Chemical Patents Inc., Linden, N.J.

[21] Appl. No.: 542,235

[22] Filed: Jun. 22, 1990

[51] Int. Cl.$^5$ .............................................. C08G 81/02
[52] U.S. Cl. ................................... 525/100; 525/106; 156/60; 156/321; 156/327
[58] Field of Search .................. 525/100, 106; 156/60, 156/321, 327

[56] References Cited

U.S. PATENT DOCUMENTS

| | | | |
|---|---|---|---|
| 4,032,592 | 6/1967 | Ogihura . | |
| 4,328,323 | 5/1982 | Keogh | 525/106 |
| 4,336,358 | 6/1982 | Alberts et al. | 525/404 |
| 4,343,917 | 8/1982 | Keogh | 525/106 |
| 4,368,240 | 1/1983 | Alberts et al. | 525/404 |
| 4,369,289 | 1/1983 | Keogh | 525/105 |
| 4,404,349 | 9/1983 | Keogh | 525/106 |
| 4,453,997 | 6/1984 | Hori et al. | 156/332 |
| 4,526,930 | 7/1985 | Keogh | 525/105 |
| 4,554,304 | 11/1985 | Hansen et al. | 524/291 |
| 4,575,535 | 3/1986 | Keogh | 525/106 |
| 4,579,913 | 4/1986 | Keogh | 525/326.5 |
| 4,593,071 | 6/1986 | Keogh | 525/288 |
| 4,593,072 | 6/1986 | Keogh | 525/326.5 |
| 4,654,389 | 3/1987 | Graham et al. | 524/272 |
| 4,707,520 | 11/1987 | Keogh | 525/245 |
| 4,726,869 | 2/1988 | Matsui et al. | 156/307.3 |
| 4,753,993 | 6/1988 | Keogh | 525/100 |
| 4,820,368 | 4/1989 | Markeuka et al. | 525/111 |
| 4,870,140 | 9/1989 | Ryntz | 525/443 |
| 4,908,411 | 3/1990 | Kinoshita et al. | 525/301 |
| 5,006,582 | 4/1991 | Mancinelli | 524/271 |
| 5,047,476 | 9/1991 | Keogh | 525/106 |

FOREIGN PATENT DOCUMENTS

| | | |
|---|---|---|
| 0249442A2 | 12/1987 | European Pat. Off. . |
| 0311722A1 | 4/1989 | European Pat. Off. . |
| WO8911506 | 11/1989 | United Kingdom . |
| WO8911514 | 11/1989 | United Kingdom . |
| WO89/11506 | 11/1989 | World Int. Prop. O. . |
| WO89/11514 | 11/1989 | World Int. Prop. O. . |

Primary Examiner—John Kight, III
Assistant Examiner—John M. Cooney, Jr.
Attorney, Agent, or Firm—Catherine L. Bell; Myron B. Kurtzman

[57] ABSTRACT

A water-curable hot melt adhesive system is disclosed. The system uses silane hydrolyzable functionality grafted onto an ethylene polymer component, and a tackifier compatible therewith. The ethylene polymer component is a copolymer of ethylene and a hydrocarbyl ester of an $\alpha,\beta$-ethylenically unsaturated carboxylic acid, and the tackifier component provides the adhesive with sufficient silanol condensation catalytic activity to accelerate water curing. The formulation is applied to a substrate surface as a hot melt at a moderate temperature, and subsequently cured by moisture or in a warm water bath. The invention also embodies structural compositions having glass, metallic or leather surfaces adhered with the adhesive and a method for making structural composites.

18 Claims, No Drawings

WATER-CURABLE, HOT MELT ADHESIVE COMPOSITION

FIELD OF THE INVENTION

This invention relates to water-curable adhesives based on silane-grafted copolymers of ethylene and esters of $\alpha,\beta$-ethylenically unsaturated carboxylic acids.

BACKGROUND OF THE INVENTION

Water-curable polyolefins have found use in the prior art in the area of adhesives. Advantages of water-cured adhesives result from the avoidance of a free-radical curing process, the elimination of flammable peroxide initiators and corrosive crosslinking acceleration agents associated therewith, and the ability to cure with water, often using ambient moisture.

However, there remain two primary disadvantages associated with as-mixed water-curable adhesives: (1) organic solvent based application techniques; and (2) the tendency for small molecule silane condensation catalysts to migrate to the adhesive surface.

The use of organic solvents during the process of applying the adhesive composition to a substrate surface not only complicates manufacture by the requirement of a solvent removal step, but can also pose health and environmental hazards. Migration of small molecule silane condensation catalysts (many of which are also commonly used as slip and/or anti-block additives) to the coating interface can result in adverse adhesion properties.

As far as the Applicant is aware, there is no prior art technology for eliminating the use of organic solvents and reducing silanol condensation catalyst migration.

U.S. Pat. Nos. 4,753,993; 4,707,520; 4,593,072; 4,593,071; 4,579,913; 4,575,535; 4,526,930; 4,369,289; 4,328,323 all to Keogh disclose thermoplastic polymers having hydrolyzable, pendant silane moieties which impart water-curability to the polyolefin polymer. These polymers are stated to be useful in extrusion coating operations, especially as extrusion coated insulation for electrical conductors wherein external moisture conditions gradually improve the polymer toughness.

U.S. Pat. No. 4,726,869 to Matsui et al. discloses a method for joining shaped articles of cured polyolefin utilizing a water-curable polyolefin applied to one or both surfaces in the form of a low viscosity liquid applied with a brush, wherein the polyolefin is grafted with an unsaturated organic silane monomer.

SUMMARY OF THE INVENTION

The adhesive compositions of this invention utilize silane grafted polymers which can eliminate the need for solvents or dispersion media by employing suitable tackifiers which permit application of the composition as a hot melt. Further, catalytic activity inherent in the tackifier component can facilitate curing of the adhesive as a substrate coating upon exposure to water and eliminate the need for additional silanol condensation catalysts which can otherwise migrate to the coating interface and worsen adhesion properties.

Accordingly, in one aspect, the invention provides a water-curable, hot melt adhesive composition, comprising a blend of (a) copolymer of ethylene and ester of $\alpha,\beta$-ethylenically unsaturated carboxylic acid, grafted with a silane monomer, and (b) a suitable tackifier. The tackifier generally facilitates the wetting of substrate surfaces, and preferably has silanol condensation catalytic activity for accelerating the curing process. The silane functionality can be represented by:

wherein Z is a hydrolyzable radical; and V is hydrogen, hydrocarbon radical or Z. The pendant silane moieties of these hot melt adhesive compositions provide enhanced adhesive strength to glass, metallic and leather substrates, and enable water curability for enhanced polymeric cohesive strength.

This invention also provides for structures comprising substrates having at least a portion of one surface adhered to a hot melt, water-curable adhesive composition comprising a silane grafted ethylene copolymer and tackifier resin.

In another embodiment, this invention provides a method employing the adhesive compositions containing the hot melt, for bonding an adhesive to a substrate surface. The method includes the steps of: (a) applying a molten hot melt adhesive to a first substrate surface, the adhesive comprising an intimate mixture of (i) a silane grafted copolymer component and (ii) a tackifier compatible therewith which preferably has residual silanol condensation catalytic activity; (b) optionally placing opposite the first surface a second substrate surface in adhesive contact with the hot melt adhesive; and (c) water-curing the adhesive.

DETAILED DESCRIPTION OF THE INVENTION

Water-curable hot melt adhesives of the present invention utilize reactive hydrolyzable silane moieties, particularly in applications where it is desired to enhance adhesive strength to substrates with surface reactivity. It has also been discovered that certain tackifying resins have inherent silanol condensation catalytic activity such that there is no need for conventional silanol condensation catalysts. These smaller molecule catalysts have a tendency to migrate to the interface between the adhesive coating and the substrate surface. This migration may worsen the adhesion properties of the adhesive composition. Application by hot melt techniques eliminates organic solvents which can pose health and environmental hazards. In addition to having excellent adhesive strength, the present adhesives are water-curable for enhanced mechanical strength.

Adhesive compositions which embody the present invention comprise an admixture of a silane-grafted copolymer of ethylene and an ester of an $\alpha,\beta$-ethylenically unsaturated carboxylic acid, and a suitable tackifier resin. The blend may comprise from about 1 to about 95 parts by weight of the tackifier, and from about 5 to about 99 parts by weight of the grafted copolymer. Preferably, the tackifier comprises from about 30 to about 70 parts by weight, and the grafted copolymer from about 30 to about 70 parts by weight of the composition.

The water-curable copolymers used in this invention generally have pendant, grafted hydrolyzable silane radicals. The term "grafted" means that the silane functionality can be copolymerized into a main chain, free radical grafted, or transesterified as side chains onto the polymeric backbone. The silane functionality is expressed by the general formula:

$$\underset{\underset{V}{|}}{\overset{\overset{V}{|}}{-Si-Z}} \qquad (I)$$

wherein Z is a hydrolyzable organic radical having less than about 20 carbon atoms, and each V is independently hydrogen, a monovalent saturated hydrocarbon radical having from 1 to about 20 carbon atoms, preferably 1 to 4 carbon atoms, or Z. Radical Z is exemplified by $C_1$ to $C_8$, preferably $C_1$ to $C_4$ alkoxy radicals such as methoxy, ethoxy and butoxy; $C_1$ to $C_8$ acyloxy radicals, preferably $C_1$ to $C_3$ radicals such as formyloxy, acetoxy and propionoxy; oximo radicals such as $-ON=C(CH_3)_2$, $-ON=C(CH_3)C_2H_5$ and $-ON=C(C_6H_5)_2$; substituted amino radicals such as $-NHCH_3$, $-NHC_2H_5$ and $-NH-(C_6H_5)$; and the like. Representative examples of monovalent saturated radicals suitable as V in formula I include, for example, methyl, ethyl, propyl, tetradecyl, octadecyl, phenyl, benzyl, tolyl, and the like.

The silane functionality preferably incorporates from about 50 to about 10,000 ppm by weight of silicon into the grafted copolymer, more preferably from about 500 to about 10,000 ppm silicon, and especially from about 2000 to about 10,000 ppm of silicon.

The melt index (MI) of the silane grafted copolymers utilized in the present invention preferably ranges from about 5 to about 2500 dg/min, and more preferably from about 10 to about 1000 dg/min. MI, as used herein, is measured according to ASTM D-1238 condition 190° C./2.06 kg, unless otherwise indicated.

A silane-grafted water-curable copolymer suitably employed in the present composition may be obtained by conventional grafting procedures, such as, for instance, heating, generally under conditions of shear, a mixture of copolymer, free radical producing compound, and unsaturated organic silane compound represented by the formula:

$$\underset{\underset{V}{|}}{\overset{\overset{V}{|}}{R-Si-Z}} \qquad (II)$$

where R is a monovalent unsaturated radical having 1 to about 20 carbon atoms and V and Z are as defined above. Radical R is, for instance, vinyl, allyl, butenyl, cyclohexenyl, cyclopentadienyl, cyclohexadienyl, methacryloxypropyl, methacryloxyethyloxypropyl, methacryloxyethyl(2-hydroxy-3-oxypropyl)oxypropyl or the like. Unsaturated silane monomers most preferred in the grafting procedure are vinyl trimethoxysilane and γ-methacryloxypropyl tris(methoxy)silane.

Suitable representative examples of silane-graftable copolymers include copolymers of ethylene and hydrocarbyl esters of α,β-ethylenically unsaturated carboxylic acids. Specific, non-limiting examples of such ester comonomers include methyl acrylate, ethyl acrylate, t-butyl acrylate, methyl methacrylate, n-butyl acrylate, n-butyl methacrylate, 2-ethylhexyl acrylate, chloroethyl acrylate and the like. Methyl acrylate, ethyl acrylate, t-butyl acrylate and methyl methacrylate ester comonomers are preferred. The ethylene-ester copolymers which are grafted with silane functionality for use in the present composition may comprise from about 5 to about 50 parts by weight of the hydrocarbyl ester copolymerized with from about 50 to about 95 parts by weight ethylene, and preferably, the ethylene copolymers comprise from about 10 to about 30 parts by weight of the hydrocarbyl ester copolymerized with from about 70 to about 90 parts by weight ethylene.

In a preferred embodiment, the copolymer also contains an α,β-ethylenically unsaturated carboxylic acid termonomer. An advantage of employing the termonomer is that the carboxylic acid functionality can catalyze the crosslinking reactions and the need for additional curing accelerators can be greatly reduced and/or eliminated altogether. The terpolymer may comprise from 5 to about 50 parts by weight of the hydrocarbyl ester and acid and 50 to about 95 parts by weight ethylene, and preferably, the terpolymer comprises from about 10 to about 30 parts by weight hydrocarbyl ester and acid and 70 to about 90 parts by weight ethylene. The ratio of ester to acid may vary from about 0.5 to about 100, preferably from about 5 to about 70.

The unmodified ethylene copolymer, prior to grafting, is generally characterized by a MI from about 10 to about 5000 dg/min, preferably from about 20 to about 2000 dg/min.

Suitable free radical producing compounds generally include 0.05–0.5 percent by weight of organic peroxides or other free-radical initiators. Further details regarding the free radical grafting process are found, for example, in U.S. Pat. No. 4,726,869 to Matsui et al., which is hereby incorporated herein by reference.

Another method of preparing the water-curable silane grafted copolymers is by transesterification which occurs between silane esters of an unsaturated or saturated carboxylic acid and hydrocarbyl esters incorporated into the copolymer. Transesterification may be effected in conventional equipment utilizing a silane monomer and organotitanate catalyst according to well known techniques. The silane monomer may be expressed as:

$$\underset{\underset{V}{|}}{\overset{\overset{V}{|}}{R'-Si-Z}} \qquad (III)$$

wherein R' is a monovalent saturated or unsaturated hydrocarbyl ester or oxysubstituted hydrocarbyl ester radical having 1 to about 20 carbon atoms; and Z and V are as previously defined. Suitable examples of radical R' include, for example, methacryloxypropyl, methacryloxyethyloxypropyl, methacryloxyethyl(2-hydroxy-3-oxypropyl)oxypropyl, acetoxyethyl, acetoxypropyl, acetoxyethyloxypropyl, and the like. Examples of silane transesterification monomers include γ-methacryloxypropyltris(methoxy) silane, γ-acetoxypropyltris(methoxy) silane, acetoxyethyltris(methoxy) silane, and acetoxyethyltris(ethoxy) silane. Further details regarding the transesterification reaction between a silane monomer and an ester functionalized ethylene copolymer may be found, for example, in U.S. Pat. No. 4,526,930 to Keogh which is hereby incorporated herein by reference.

An alternative method of preparing the water-curable silane grafted copolymers involves copolymerization of the unsaturated silane comonomers of formula II with ethylene, and one or more of the α,β-ethylenically unsaturated esters (and/or acids) mentioned above using vinyl polymerization procedures and equipment well known in the art.

The second component of the hot melt adhesive formulation is the tackifier. Suitable tackifiers for use in the composition of the invention include those tackifying resins which are compatible with the copolymer, promote wetting of the particular substrate to which the hot melt is applied, and preferably have functional groups such as carboxylic acid, trialkyltin laurate, dialkyltin dilaurate, or another functional group capable of catalyzing the crosslinking. Tackifiers typically have a ring and ball softening point from about 25° C. to about 180° C., preferably from about 50° C. to about 135° C. Preferred tackifiers are those with carboxylic acid functionally, having an acid number of at least about 5, and more preferably have an acid number between about 10 and about 100. Residual acidity of the tackifier, we have discovered, improves the physical properties of the cured adhesive and provides sufficient silanol condensation catalytic activity for accelerating adhesive cure. Tackifiers such as rosin esters and hydrocarbon resins are suitable. Examples include rosin esters available under the trade designations PENTALYN, SYLVATAC, ZONESTER and the like; hydrogenated rosin esters available under the trade designations FORAL, HERCOLYN, HYDROTAC, STAYBELITE ESTER, and the like; aromatic hydrocarbon resins available under the trade designations ESCOREZ, CUMAR and the like; and aliphatic hydrocarbon resins available under the trade designations ESCOREZ, PICCOTAC, and the like. Rosins and rosin esters with an acid number of at least 5 are preferred. Tackifier obtained under the trade designation FORAL 105 has been found to be particularly suitable.

The adhesive of this invention optionally contains up to about 0.2 parts by weight of a compound that accelerates the water curing of the silane modified ethylene copolymer, such as an additional silanol condensation catalyst. Examples include metal carboxylate silanol condensation catalysts, such as, for example, tributyltin laurate, dibutyltin dilaurate, dibutyltin diacetate, stearic acid, and the like.

Quite surprisingly, it has been found that residual acidity of the tackifier resin component ordinarily has sufficient catalytic activity to accelerate curing, and obviates the need for such additional silanol condensation catalysts. Even more surprisingly, however, is the discovery that the presence of additional silanol condensation catalysts adversely affects adhesion. In a preferred embodiment, the composition is essentially free of such additional silanol condensation catalysts.

The hot melt adhesive composition may further contain relatively minor amounts of ingredients such as waxes, oils, fillers, coupling agents, colorants, antioxidants, and other stabilizing additives which do not substantially adversely affect the system such as, for example, by adversely interfering with the silane crosslinking or adhesion of the hot melt to a substrate surface. The formulation is preferably essentially free of solvents and other vaporizable constituents which detract from the hot melt characteristics of the formulation, e.g. no need for drying or solvent removal.

The antioxidant or stabilizer can be added to the hot melt at from about 0.1 to about 1.5 percent by weight, and preferably from about 0.1 to about 1 percent by weight, and typically about 0.5 weight percent.

The optional wax component is typically derived from refined fractions of crude oil, and therefore, consists essentially of paraffinic hydrocarbons which contain significant amounts of branched chain and cycloparaffin as well as aromatics. This composition of components is characterized by exhibiting the formation of only small crystalline regions in the solid wax so that these waxes, as compared to paraffin waxes with fewer branch and cyclic groups, are generally softer and more flexible than an otherwise comparable paraffin wax having a similar melting point or range. Microcrystalline waxes are well known in the art and are readily available commercially under trade designations including SHELL WAX 905, MICROHEX 4, VICTORY, ESCOMER H-101, MOORE and MUNGER'S PARAFLINT H-1, and the like.

The optional oils which may be mentioned include refined hydrocarbon oils such as are commonly used in adhesives, including paraffinic, aromatic, and naphthenic oils available under the trade designations KAYDOL, TUFFLO, and the like. The refined oils serve to reduce viscosity and improve surface tack properties.

Particulated fillers which may be used for thickening include glass, silica, amorphous $SiO_2$, fumed alumina, calcium carbonate, fibers and the like. Suitable commercially available fillers are available under the trade designations CAB-O-SIL, ZEOSIL 35, AEROSIL R972, DUCRAL 10 and the like. The ability of fillers such as glass fibers which possess surface hydroxyl groups to participate in the crosslinking chemistry is one means of further improving the high temperature strength of the adhesive.

Suitable coupling agents include (but are not limited to) organometallic compounds such as, for example, organozirconates, organozircoaluminates, chrome complexes and the like. Typical concentrations are from about 0.3 to about 1.2 percent by weight of the adhesive formulation. These are generally selected to promote adhesion based on the substrates and/or fillers involved in the particular application.

The curable hot melt adhesive compositions of this invention are prepared by blending together the components in a melt until a homogeneous blend is obtained. Various methods of blending materials of this type are known to the art, and any method that produces a homogeneous blend is satisfactory. Typical blending equipment includes, for example, mixing extruders, roll mills, Banbury mixers, Brabenders, and the like. In general, the blend components blend easily in the melt and a heated vessel equipped with a stirrer is all that is required. The components are added in no particular order, but generally, the tackifying resin is added first and heated in the vessel until molten. Thereafter, the silane modified ethylene copolymer is placed in the vessel and heated and mixed. Any other optional ingredients are generally added last.

The hot melt adhesive may be cooled and later reheated for use, or used directly, e.g. supplied from a reservoir or melt-pot to a substrate using conventional equipment, for example, for pumping or pressure extrusion through slot dies. An important feature of the present invention is that the hot melt formulation has a good melt pot stability so that appreciable premature curing of the formulation is not usually encountered at typical hot melt conditions, such as, for example, from about 60° C. to about 140° C., preferably above 100° C. to avoid moisture condensation, generally on the order of several hours or more. Generally, the hot melt is heated sufficiently for a target viscosity of about 100,000 cps, although a viscosity as high as 150,000 cps can usually be tolerated. For suitable pot stability, the viscosity of the hot melt should not increase more than 20 percent when maintained at the pot temperature for a period of 8 hours.

Another important aspect of this invention is that the hot melt formulation has a good open time so that the melted adhesive coating remains tacky and receptive to another substrate surface layer for a sufficient amount of processing time.

The adhesive may be used in joining substrates of similar or dissimilar materials. This adhesive is particularly useful in adhering or joining articles, sheets, or films composed of metallic or glass substrates in homogeneous or heterogeneous combinations. Leather articles and sheets are also excellent substrate materials. The cured adhesives which embody the present invention have high mechanical strength and may be suitable alternatives to fused joining in the case of metallic or silicate (glass) substrates in certain circumstances.

After the hot melt is applied to a first substrate surface, a second substrate surface may be placed opposite the first surface in contact with the adhesive to form a laminate or composite structure. The adhesive remains tacky while molten, and cools forming an adhesive bond to the substrate(s). The joined composite structure can subsequently be cured in a warm water bath, for example, to effect accelerated water curing. The joined composite structure may also be cured over a longer period of time by environmental exposure to moisture and/or water.

Crosslinking is generally effected by reaction between hydrolyzable alkoxy silane functionality in the grafted copolymer component and water. Crosslinking results from intermolecular condensation of silanols to form silicone bonds. Silanol intermediates are formed from the alkoxy functionality by hydrolysis. Silane functionality also has the ability to form chemical bonds with hydroxylated surfaces, such as silicate or metallic substrates, for improved adhesion to such substrates.

When applied as a hot melt essentially free of additional silanol condensation catalysts, the adhesives of the present invention can be supplied as pre-mixed compositions. Hot melt application eliminates the need for organic solvents. The hot melt silane modified ethylene copolymers are water-curable, thereby eliminating the need to employ radical crosslinking additives to cure the adhesive.

The invention is illustrated by way of the Examples and Comparative Examples below.

Samples for T-peel and single lap shear adhesion testing using untreated aluminum or glass as substrates were prepared as follows:

For T-peel testing, the molten adhesive was poured onto a silicone coated release paper and smoothed to a thickness of about 6 mils by drawing a heated bar across the adhesive layer. The adhesive film, after cooling was peeled from the release paper and bonded between 2 pieces of 5 mil thick aluminium sheets under the bonding conditions of 150° C./40 psi/10 seconds. T-peel strength is defined as the average load per unit width of bondline required to produce progressive separation of 2 bonded adherends. The separation speed was 2 inches/minute.

For lap shear testing, the solid polymer adhesive blend was pressed in a mold at 100° C. for 5–10 seconds to form a sheet upon cooling. The sheet was then cut into 1 inch by 1 inch squares and clamped between aluminum rectangular coupons (4"×1"×0.06") using 8 mil wires as spacers. The clamped coupons were put in an oven at a temperature between 150° C. and 180° C. for 5 minutes to form an initial bond and subsequently cured under ambient conditions. Lap shear was determined in accordance with ASTM D-1002-72 modified for a 1 inch overlap and a separation speed of 0.2 in./min.

EXAMPLE 1A

An EMA copolymer (26.5 weight percent methyl acrylate, MI=110) was fed into a counter-rotating, non-intermeshing, twin screw extruder with a 42 L/D and a temperature profile varying linearly with length from 140° C. at the inlet to 180° C. at the exit. A stream of vinyl trimethoxysilane/dicumyl peroxide (5.4 weight percent peroxide) mixture was injected into the extruder at a rate of 12.7 ml/min. The grafted polymer produced was devolatilized in a vacuum oven operating at 1 mm Hg and 100° C. for 3 hours. The grafted polymer had a silicon content of 6380 ppm as determined by X-ray fluorescence (XRF) analysis. The grafted product had a MI of 78 dg/min which, after blending with 0.2 percent by weight stearic acid and exposure for 3 days in an 80° C. water bath, fell to 0.7 dg/min. The gel content of the water-cured material was 30 weight percent.

EXAMPLE 1B

An EMA copolymer (26.5 weight percent methyl acrylate MI=110) was fed into a counter-rotating non-intermeshing twin screw extruder with a 42 L/D and a temperature profile varying linearly with length from 140° C. at the inlet to 180° C. at the exit. A comonomer stream of vinyl trimethoxysilane/dicumyl peroxide (5.4 weight percent peroxide) mixture was injected into the extruder at a rate of 2.5 ml/min. The grafted polymer produced was devolatilized in a vacuum oven operating at 1 mm Hg and 100° C. for 3 hours. The grafted polymer had a silicon content of 660 ppm as determined by XRF analysis. The grafted product had a MI of 86 dg/min.

COMPARATIVE EXAMPLE 1 AND EXAMPLES 2–7

According to procedures from Example 1A and Example 1B, a 26.5 weight percent methyl acrylate EMA copolymer with a MI of 110 dg/min was grafted with vinyltrimethoxy silane monomer at two different concentrations; then the silane modified copolymer was blended with 0.2 percent by weight stearic acid silanol condensation catalyst. The adhesive mixtures were then bonded between two pieces of aluminum substrate and cured under ambient conditions. T-peel tests were performed to test for aluminum adhesion against curing time and silane concentration. The test temperature was 27° C. Results in Table I indicate that ungrafted EMA has little adhesion to aluminum, and that aluminum adhesion improves with increasing concentration of silane grafts and aging time up to an optimum plateau. A silanol condensation catalyst was required to catalyze curing of the copolymer in the absence of a suitable tackifier.

TABLE I

| EXAMPLE | BASE POLYMER | SILICON CONC. (ppm) | STEARIC ACID CONC. (%) | AGING TIME (days) | T-PEEL (lb/in.) |
| --- | --- | --- | --- | --- | --- |
| 2 | Example 1B | 660 | 0.2 | 2.5 | 2.6 |
| 3 | Example 1A | 6380 | 0.2 | 2.5 | 4.6 |
| 4 | Example 1B | 660 | 0.2 | 7.5 | 4.3 |
| 5 | Example 1A | 6380 | 0.2 | 7.5 | 5.9 |
| 6 | Example 1B | 660 | 0.2 | 11.5 | 3.5 |
| 7 | Example 1A | 6380 | 0.2 | 11.5 | 7.2 |
| Comp. 1 | EMA | 0 | 0 | 2.5 | 0 |

COMPARATIVE EXAMPLES 2-5 AND EXAMPLES 8-19

Water-curable hot melt adhesive compositions were made by blending silane grafted EMA with a tackifier and, optionally, stearic acid as an additional silanol condensation catalyst. The EMA copolymers were either prepared according to Examples 1A or 1B respectively. Comparative Examples 2 through 5 were formulated with ungrafted EMA copolymer (26.5 percent MA, MI=110 dg/min). FORAL 105 tackifier was blended with the grafted copolymer at a weight ratio of 60:40 tackifier:copolymer. Samples utilizing a curing catalyst (Examples 9, 12, 15 and 18) were also prepared by blending with stearic acid to 0.1 percent by weight of the blended composition. Lap shear specimens using an aluminum substrate were made and cured under ambient conditions for 12 days. Lap shear tests were performed on the specimens to determine the utility of using stearic acid to catalyze the curing process. Results appear in Table II.

COMPARATIVE EXAMPLES 6 AND EXAMPLES 20-21

T-peel tests were performed on aluminum samples, prepared similarly to Comparative Example 1 and Examples 2-7 and coated with the grafted polymer of Example 1A. The adhesive compositions were 40 percent polymer and 60 percent tackifier FORAL 105. The test temperature was 27° C. The results are presented in Table III.

TABLE III

| EXAMPLE | BASE POLYMER | SILICONE CONC. (ppm) | STEARIC ACID CONC. (%) | T-PEEL (lb/in.) |
| --- | --- | --- | --- | --- |
| Comp. 6 | EMA | 0 | 0 | 6.0 |
| 20 | Example 1A | 6380 | 0 | 8.9 |
| 21 | Example 1A | 6380 | 0.1 | 7.3 |

The results in Table III show the silane grafted composition having enhanced adhesion to aluminum sub-

TABLE II

| EXAMPLE | BASE POLYMER | TEST TEMPERATURE (°C.) | SILICON CONC. (ppm) | STEARIC ACID CONC. (%) | LAP SHEAR (psi) |
| --- | --- | --- | --- | --- | --- |
| Comp. 2 | EMA | 27 | 0 | 0 | 470 |
| 8 | Example 1A | 27 | 6380 | 0 | 480 |
| 9 | Example 1A | 27 | 6380 | 0.1 | 490 |
| 10 | Example 1B | 27 | 660 | 0 | 523 |
| Comp. 3 | EMA | 40 | 0 | 0 | 11 |
| 11 | Example 1A | 40 | 6380 | 0 | 203 |
| 12 | Example 1A | 40 | 6380 | 0.1 | 198 |
| 13 | Example 1B | 40 | 660 | 0 | 37 |
| Comp. 4 | EMA | 50 | 0 | 0 | 5 |
| 14 | Example 1A | 50 | 6380 | 0 | 93 |
| 15 | Example 1A | 50 | 6380 | 0.1 | 62 |
| 16 | Example 1B | 50 | 660 | 0 | 3 |
| Comp. 5 | EMA | 60 | .0 | 0 | 1 |
| 17 | Example 1A | 60 | 6380 | 0 | 40 |
| 18 | Example 1A | 60 | 6380 | 0.1 | 32 |
| 19 | Example 1B | 60 | 660 | 0 | 2 |

The foregoing illustrates that there was sufficient unesterified rosin acid in the rosin ester tackifier to make unnecessary the inclusion of stearic acid. Additional silanol condensation catalyst appeared to worsen aluminum adhesion in 3 of 4 comparative tests; note especially Examples 14 and 15 where additional stearic acid silanol condensation catalyst made the lap shear adhesion much worse. The above examples also, illustrated that the copolymer of Example 1A containing 6380 ppm silicon provided sufficient crosslinking for improved high temperature shear, while the copolymer of Example 1B containing 660 ppm silicon did not (Examples 13, 16 and 19).

strates compared with the ungrafted control sample. However, when additional silanol condensation catalyst was utilized, aluminum adhesion was reduced.

COMPARATIVE EXAMPLE 7-10 AND EXAMPLES 22-29

Lap shear adhesion tests were performed on coated aluminum samples as prepared in Comparative Examples 2-5 and Examples 8-19. The adhesive samples were immersed over 3 weeks in a 5 percent salt (NaCl) bath at 35° C. Corrosion resistance was examined comparing an adhesive containing silane modified EMA with one containing unmodified EMA. The test temperature was 27° C. The results are presented in Table IV.

TABLE IV

| EXAMPLE | BASE POLYMER | AGING 5% NaCl (weeks) | SILICON CONC. (ppm) | STEARIC ACID CONC. (%) | LAP SHEAR (psi) |
| --- | --- | --- | --- | --- | --- |
| Comp. 7 | EMA | 0 | 0 | 0 | 470 |
| 22 | Example 1A | 0 | 6380 | 0 | 480 |
| 23 | Example 1A | 0 | 6380 | 0.1 | 490 |
| Comp. 8 | EMA | 1 | 0 | 0 | 410 |
| 24 | Example 1A | 1 | 6380 | 0 | 540 |
| 25 | Example 1A | 1 | 6380 | 0.1 | 440 |
| Comp. 9 | EMA | 2 | 0 | 0 | 300 |
| 26 | Example 1A | 2 | 6380 | 0 | 457 |
| 27 | Example 1A | 2 | 6380 | 0.1 | 442 |
| Comp. 10 | EMA | 3 | 0 | 0 | 70 |
| 28 | Example 1A | 3 | 6380 | 0 | 375 |
| 29 | Example 1A | 3 | 6380 | 0.1 | 333 |

Results shown in Table IV demonstrate how the adhesion strength of silane modified EMA adhesives are far more resistant to corrosion from NaCl (aq) than the adhesion strength of unmodified EMA adhesives.

Also as in Comparative Examples 2–5 and Examples 8–19, the utility of stearic acid curing catalyst was studied. Stearic acid was found to be unnecessary and further, in 3 of 4 instances, undesirable. Note especially the comparison between Examples 24 and 25, and Examples 28 and 29 where lap shear adhesion was worse for those examples containing stearic acid.

COMPARATIVE EXAMPLE 11 AND EXAMPLES 30–31

T-peel tests were performed on coated aluminum samples, prepared similarly to Comparative Example 6 and Examples 20–21. However, the tackifier used was ESCOREZ-2393 instead of FORAL 105. ESCOREZ-2393 is a hydrocarbon resin prepared from C9 aromatic and C5 aliphatic feed stocks with a ring and ball softening point of about 93° and acid number of 0. The test temperature was 27° C. The results are presented in Table V.

TABLE V

| EXAMPLE | POLYMER | SILICON CONC. (ppm) | STEARIC ACID CONC. (%) | T-PEEL (lb/in.) |
| --- | --- | --- | --- | --- |
| Comp. 11 | EMA | 0 | 0 | 4.0 |
| 30 | Example 1A | 6380 | 0 | 4.8 |
| 31 | Example 1A | 6380 | 0.1 | 5.3 |

The results in Table V show that the silane grafted compositions have enhanced adhesion to aluminum substrates compared with the ungrafted control sample.

COMPARATIVE EXAMPLES 12–15 AND EXAMPLES 32–35

Lap shear adhesion tests were performed on samples prepared similarly to Comparative Examples 2–5 and Examples 8–19 except that glass slides (4"×1"×0.19") were bonded with a ½" overlap of coating to be tested at a separation speed of 0.4 inches/minute. Adhesive blends were prepared and cured, as mentioned above, except no silane condensation catalyst was utilized other than catalytic activity residual in the FORAL 105 tackifier. Results comparing temperature adhesion performance of the silane modified and unmodified EMA copolymer appear in Table VI. In all cases, the silane modified EMA, Example 1A, had substantially higher lap sheer adhesion performance than unmodified EMA. Most noteworthy is that at 27° C. the glass slide fractured before adhesive failure occurred.

TABLE VI

| EXAMPLE | TEMPERATURE (°C.) | COMPOSITION (wt. %) | | | SILICON CONC. (ppm) | LAP SHEAR (psi) |
| --- | --- | --- | --- | --- | --- | --- |
| | | EMA | EXAMPLE 1A | FORAL 105 | | |
| Comp 12 | 27 | 40 | | 60 | 0 | 376 |
| 32 | 27 | | 40 | 60 | 6380 | * |
| Comp 13 | 40 | 40 | | 60 | 0 | 40 |
| 33 | 40 | | 40 | 60 | 6380 | 199 |
| Comp 14 | 50 | 40 | | 60 | 0 | 11 |
| 34 | 50 | | 40 | 60 | 6380 | 88 |
| Comp 15 | 60 | 40 | | 60 | 0 | 0 |
| 35 | 60 | | 40 | 60 | 6380 | 56 |

NOTE FOR TABLE VI:
*glass fracture prior to bond failure.

The foregoing description of the invention is provided for illustrative purposes. Many variations and modifications of the invention will become apparent to those skilled in the art in view of the foregoing disclosure. It is intended that all such variations and modifications within the scope or spirit of the appended claims be embraced thereby.

We claim:

1. A water curable, hot melt adhesive composition, comprising a blend of:
   (a) a copolymer of ethylene and an ester of an α-β ethylenically unsaturated carboxylic acid having grafted silane functionality wherein said copolymer comprises ethylene in an amount from about 50 to about 95 parts by weight copolymerized with said ester in an amount from about 5 to about 50 parts by weight; and
   (b) a tackifier having an acid number of at least about 5, said adhesive composition being essentially free of metal carboxylate and/or stearic acid silanol condensation catalysts.

2. The adhesive composition of claim 1, wherein said copolymer comprises ethylene in an amount of from about 70 to about 90 parts by weight copolymerized with said ester in an amount of from about 10 to about 30 parts by weight.

3. The adhesive composition of claim 1, wherein said silane grafted copolymer has a melt index in the range of from about 5 to about 2500 dg/min.

4. The adhesive composition of claim 1, wherein said silane grafted copolymer has a melt index in the range of from about 10 to about 1000 dg/min.

5. The adhesive composition of claim 1, wherein said grafted copolymer includes pendant silane functionality as is represented by:

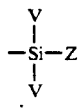

wherein Z is a hydrolyzable radical and V is hydrogen, or a hydrocarbon radical or Z.

6. The adhesive composition of claim 1, wherein said silane functionality is provided by a silane monomer selected from the group consisting of vinyltrimethoxy silane, γ-methacryloxypropyltris(methoxy)silane, γ-acetoxypropyltris(methoxy)silane, acetoxyethyltris(methoxy)silane, and acetoxyethyltris(ethoxy)silane.

7. The adhesive composition of claim 1, wherein said copolymer comprises from about 50 to about 10,000 parts per million of silicon.

8. The adhesive composition of claim 1, wherein said copolymer comprises from about 500 to about 10,000 parts per million of silicon.

9. The adhesive composition of claim 1, wherein said copolymer comprises from about 2000 to about 10,000 parts per million of silicon.

10. The adhesive composition of claim 1, wherein said adhesive comprises said copolymer in an amount of from about 5 to about 99 parts by weight, and said tackifier in an amount of from about 1 to about 95 parts by weight.

11. The adhesive composition of claim 1, wherein said adhesive composition comprises said copolymer in an amount of from about 30 to about 70 parts by weight, and said tackifier in an amount of from about 30 to about 70 parts by weight.

12. The adhesive composition of claim 1, having an acid number between about 10 and about 100.

13. The adhesive composition of claim 1, wherein said ester is selected from the group consisting of methyl acrylate, ethyl acrylate, t-butyl acrylate and methyl methacrylate.

14. The adhesive composition of claim 1, wherein said tackifier comprises a rosin ester having an acid number of at least about 5.

15. The adhesive composition of claim 1, wherein said copolymer further comprises an α, β-ethylenicaly unsaturated carboxylic acid.

16. The composition of claim 1 wherein the silanol condensation catalyst and/or metal carboxylate comprises less than 0.1 wt. %.

17. The composition of claim 1, wherein the composition contains no more than inpurity amounts of the silanol condensation catalyst and/or metal carboxylate.

18. A water curable, hot melt adhesive composition consisting essentially of a blend of:
(a) a copolymer of ethylene and an ester of an α-β ethylenically unsaturated carboxylic acid having grafted silane functionality wherein said copolymer comprises ethylene in an amount from about 50 to about 95 parts by weight copolymerized with said ester in an amount from about 5 to about 50 parts by weight; and
(b) a tackifier having an acid number of at least about 5, said adhesive composition being essentially free of metal carboxylate and/or stearic acid silanol condensation catalysts.

* * * * *